Sept. 22, 1953     E. L. VAN GUILDER     2,653,030
COUPLING AND FASTENING MEANS FOR TOOL SHANKS AND HANDLES
Filed July 3, 1950
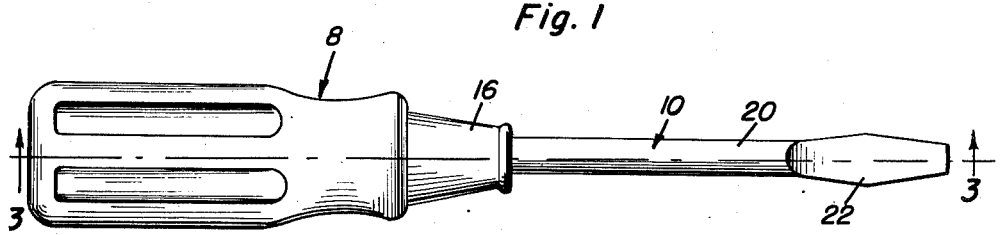
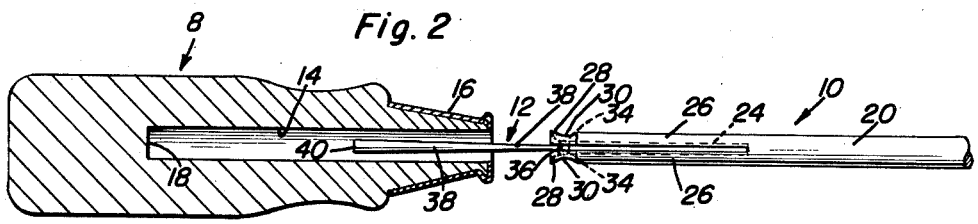
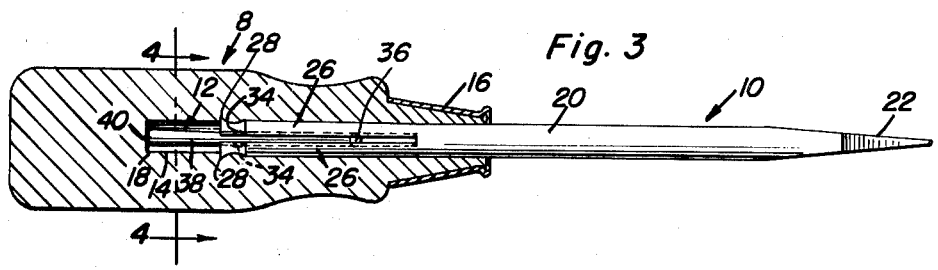
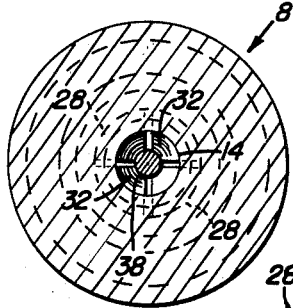
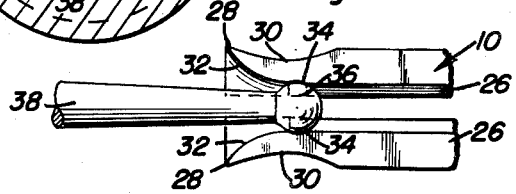
Ernest L. Van Guilder
INVENTOR.

Patented Sept. 22, 1953

2,653,030

UNITED STATES PATENT OFFICE 2,653,030

COUPLING AND FASTENING MEANS FOR TOOL SHANKS AND HANDLES

Ernest L. Van Guilder, Granville, N. Y.

Application July 3, 1950, Serial No. 171,957

2 Claims. (Cl. 279—104)

1

The present invention relates to certain new and useful improvements in an assemblage characterized by a tool shank, a socketed handle for the shank and a self-locking coupling means between the shank and socketed portion of the handle.

More specifically, the invention has to do with a tool shank having a bore with complemental expansible fingers, a wooden handle with a socket for reception of the bored end of the shank and a conical expander which when properly seated against one end of the socket in the handle serves, when the shank is driven into the socket, to expand the fingers and embed the same securely for self-locking results in the handle.

I am aware that the principle of utilizing a cone as an expander for spreadable locking fingers is not in itself new. Therefore, it is an object of the invention to structurally, functionally and otherwise improve upon handle and shank coupling and fastening devices through the medium of a structural arrangement which, it is believed, will more satisfactorily attain wanted ends.

Another object of the invention is to provide coupling and fastening means in the category under advisement in which manufacturers and users will find their essential needs fully met, contained and satisfactorily available.

More importantly, novelty is predicated on a shank whose bored end is equipped with spreadable anchoring fingers which are not only pointed to penetrate and anchor themselves but which have coacting opposed surfaces which function to resiliently grip a ball-like assembling and retaining head on the expander pin whereby it is possible to attach the pin to the fingered shank so that the two may be piloted in unison into the accommodating and anchoring socket in the complemental wooden or equivalent handle.

Other objects and advantages will become more readily apparent from the following description and the accompanying illustrative drawings.

In the accompanying sheet of drawings, wherein like numerals are employed to designate like parts throughout the views:

Figure 1 is an elevational view showing the manner in which the invention is utilized in association with an ordinary screwdriver;

Figure 2 is a view partly in section and partly in elevation showing the manner in which the conical expanding pin is initially coupled to the shank whereby both shank and pin may be readily piloted home in the socket in the handle;

2

Figure 3 is a view based on Figure 2 showing the relationship of elements after the spreadable fingers have been thrust radially apart and embedded in the wooden handle;

Figure 4 is an enlarged cross-sectional view on the plane of the line 4—4 of Figure 3, looking in the direction of the arrows;

Figure 5 is a view in some respects similar to Figure 2, with the parts in section and elevation, but showing with greater particularity the construction of the expander pin and coacting shank fingers; and Figure 6 is a view on an exaggerated scale which serves to more aptly and amply bring out the configuration and coaction of the fingers and assembling head on the expander pin.

Referring now to the drawings, and particularly with reference to Figure 2, it will be seen that the over-all assemblage is characterized by several units; namely, the handle unit 8, shank unit 10 and expander unit 12.

The handle unit 8 is preferably of wood or any equivalent compressible material and is of any appropriate shape and size. It has an axial shank accommodating and retaining socket 14 and, if desired, a suitable reinforcing ferrule 16. The closed end or bottom of the socket is denoted by the numeral 18.

The tool means, which is best referred to as a shank unit here, is denoted by the stated numeral 10 and comprises a straight rigid shank 20 having an appropriate tool 22 at one end. The tool here is a screwdriver bit. In the opposite end of the shank, I provide an axial bore which bore is then formed with longitudinal slits at circumferentially spaced equidistant points. These slits, in turn, define spreadable anchoring fingers and for convenience the bore is denoted at 24 and the like fingers by the numeral 26. All of the fingers are identical. A description of one will, therefore, suffice for all. Reference is had to Figure 6 wherein it will be seen that the tip or terminal end portions of the fingers are suitably sharpened at 28 so that they will dig and embed themselves in the socket wall in the manner brought out in Figure 3. The fingers are slightly concaved as at 30 so that they are slightly resilient. The inner opposed surfaces at 32 are relieved or otherwise suitably shaped so that together they form a sort of piloting mouth which leads into the bore. This mouth communicates with slight curvate seats 34 which conjointly form a novel and practical receiving and retaining socket for the ball-shaped head 36 on the tapered or small end of the conical expander 38.

This part 38 may be either a pin or a rod. It is rigid and of appropriate length to achieve the desired spreading and anchoring results. The larger or base end 40 is adapted to seat itself against the bottom 18 of the socket 14. As stated, I am aware that inserting spreadable fingers on a tool shank or the like into a socket and then spreading the fingers by an appropriate expander is not new. It is novel, however, in the instant construction, it is submitted, to so fashion the free or tip ends of the fingers that it is possible to temporarily couple the coacting end of the expander therewith. Thus, the expander and shank become, for the time being at least, a unitary assemblage which may be fitted with requisite nicety into the socket. As soon as the expander comes to a stationary position against the bottom of the socket, the conical surfaces begin to spread the anchoring fingers 26 so that the feather-edged or sharpened tip portions or terminal 28 will dig and thus anchor themselves into the wall portions of the socket.

I would stress the bell or mouth formed by the cluster of fingers as shown in Figure 6 which serves the pilot, the nodule or head 36 on the expander 38 into alignment with the bore in the shank. More importantly, I stress the seat forming surfaces 34 which collectively provide a temporary socket for reception and retention of said head 36. There is sufficient resiliency in the fingers to cause same to be frictionally clamped against the head and to thus couple the expander to the shank.

It is understood that when the expander end 40 comes against the surface 18 the fingers begin to spread and anchor themselves. Therefore, it is necessary to merely drive the shank into the socket for a distance when it may be determined that the desired degree of anchoring has been attained. Perhaps from time to time in case of wear and tear it may be necessary to drive the handle further on the shank for purposes of compensating for such wear.

It will be seen that while the disclosure appears to be directed to a screwdriver, the invention is actually applicable to any tool construction wherein an expander and fingered shank are novelly coupled to be anchored in a socketed wooden or equivalent handle.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a tool construction of the class described, a rigid shank having an axial bore opening through one end, said bore being cylindrical in cross-section, that portion of the wall which is coextensive with said bore having circumferentially spaced lengthwise slits opening into the bore and defining a plurality of resilient fingers, the portions of the fingers facing each other and also facing said bore being gradually reduced to feather edge proportions and providing knife-like anchors on the free ends of the fingers and simultaneously transforming the bore into a socket and said feathered surfaces into a bell mouth providing an entrance leading to said socket, and an expander adapted to be located in an opening in a tool handle, said expander comprising an elongated conical pin, the apex end of said pin being provided with a ball-like head, said head being of a diameter appreciably greater than the cross-section of the adjacent end of the pin and also of a diameter slightly greater than the diameter of said socket, said head being fitted through said bell mouth and anchored in an adjacent end portion of said socket.

2. In a tool construction of the class described, a rigid shank having an axial bore opening through one end, said bore being cylindrical in cross-section, that portion of the wall which is coextensive with said bore having circumferentially spaced lengthwise slits opening into the bore and defining a plurality of resilient fingers, the portions of the fingers facing each other and also facing said bore being gradually reduced to feather edge proportions and providing knife-like anchors on the free ends of the fingers and simultaneously transforming the bore into a socket and said feathered surfaces into a bell mouth providing an entrance leading to said socket, and an expander adapted to be located in an opening in a tool handle, said expander comprising an elongated conical pin, the apex end of said pin being provided with a ball-like head, said head being of a diameter appreciably greater than the cross-section of the adjacent end of the pin and also of a diameter slightly greater than the diameter of said socket, said head being fitted through said bell mouth and anchored in an adjacent end portion of said socket, and the co-acting portions of the wall of the socket being provided with recesses and said recesses combining in providing temporary seating and retaining means for said head, the resiliency of the fingers serving to clamp the head in said seating surfaces and the taper of said pin serving to expand the fingers for purposes of binding the anchoring terminals into retentive engagement with a tool handle opening into which the shank is adapted to be fitted and retained.

ERNEST L. VAN GUILDER.

References Cited in the file of this patent

UNITED STATES PATENTS

| Number | Name | Date |
|---|---|---|
| 351,296 | Stinson et al. | Oct. 19, 1886 |
| 453,648 | Le Baron | June 9, 1891 |
| 520,984 | Green | June 5, 1894 |
| 747,219 | Preslar | Dec. 15, 1903 |
| 751,902 | Dodge | Feb. 9, 1904 |
| 1,178,209 | Benjamin | Apr. 4, 1916 |
| 1,251,566 | Pigott | Jan. 1, 1918 |

FOREIGN PATENTS

| Number | Country | Date |
|---|---|---|
| 203,490 | Great Britain | Sept. 13, 1923 |